United States Patent
Nemeth et al.

(10) Patent No.: US 10,882,451 B2
(45) Date of Patent: Jan. 5, 2021

(54) APPARATUS FOR PROVIDING VEHICULAR ENVIRONMENT INFORMATION

(71) Applicant: KNORR-BREMSE SYSTEME FUER NUTZFAHRZEUGE GMBH, Munich (DE)

(72) Inventors: Huba Nemeth, Budapest (HU); Viktor Tihanyi, Budapest (HU); Robert Varga, Budapest (HU)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 0 days.

(21) Appl. No.: 16/327,163

(22) PCT Filed: Aug. 14, 2017

(86) PCT No.: PCT/EP2017/070582
§ 371 (c)(1),
(2) Date: Feb. 21, 2019

(87) PCT Pub. No.: WO2018/046245
PCT Pub. Date: Mar. 15, 2018

(65) Prior Publication Data
US 2019/0225153 A1 Jul. 25, 2019

(30) Foreign Application Priority Data

Sep. 8, 2016 (EP) ..................... 16187854

(51) Int. Cl.
*B60R 1/00* (2006.01)
*G06K 9/00* (2006.01)

(52) U.S. Cl.
CPC ............ *B60R 1/00* (2013.01); *G06K 9/00805* (2013.01); *B60R 2300/301* (2013.01); *B60R 2300/605* (2013.01); *B60R 2300/70* (2013.01)

(58) Field of Classification Search
CPC ..... B60R 1/00; B60R 1/02; B60R 2001/1253; B60R 1/12; B60R 2300/105;
(Continued)

(56) References Cited

U.S. PATENT DOCUMENTS

| | | | |
|---|---|---|---|
| 6,424,273 B1 * | 7/2002 | Gutta | B60R 1/00 340/435 |
| 2003/0122930 A1 * | 7/2003 | Schofield | B60R 1/00 348/148 |

(Continued)

FOREIGN PATENT DOCUMENTS

| | | |
|---|---|---|
| DE | 102006049879 A1 | 4/2008 |
| DE | 102014213171 A1 | 10/2015 |

(Continued)

OTHER PUBLICATIONS

International Search Report dated Oct. 26, 2017, of the corresponding International Application PCT/EP2017/070582 filed Aug. 14, 2017.

*Primary Examiner* — Andrew W Bee
(74) *Attorney, Agent, or Firm* — Norton Rose Fulbright US LLP; Gerard Messina

(57) ABSTRACT

An apparatus for providing vehicular environment information, includes acquiring with at least one sensor vehicular environment data that is external to a vehicle. The at least one sensor comprises at least one camera, and the vehicular environment data comprises image data. The vehicular environment data is provided to a processing unit. The processing unit determines vehicular environment information. The determination of the vehicular environment information comprises use of the vehicular environment data. At least part of the image data is displayed on a display monitor on the basis of the vehicular environment information. The processing unit causes the display monitor to display the at least part of the image data.

9 Claims, 4 Drawing Sheets

(58) Field of Classification Search
CPC .......... B60R 2300/301; B60R 2300/70; G06K 9/00805; G01S 13/9332
See application file for complete search history.

(56) References Cited

U.S. PATENT DOCUMENTS

| | | |
|---|---|---|
| 2005/0062615 A1 | 3/2005 | Braeuchle et al. |
| 2006/0092073 A1 | 5/2006 | Boecker et al. |
| 2010/0201508 A1 | 8/2010 | Green et al. |
| 2014/0192181 A1* | 7/2014 | Taylor ................ B60C 23/0408 348/118 |
| 2014/0340516 A1 | 11/2014 | Vojtisek et al. |
| 2015/0169968 A1* | 6/2015 | Michmerhuizen ......................... G08B 13/19695 348/148 |
| 2016/0362050 A1* | 12/2016 | Lee .................... G06K 9/00825 |
| 2017/0113664 A1* | 4/2017 | Nix .................... G06F 11/3072 |

FOREIGN PATENT DOCUMENTS

| | | |
|---|---|---|
| EP | 2107504 A1 | 10/2009 |
| EP | 2631696 A2 | 8/2013 |
| WO | 2014138765 A1 | 9/2014 |

\* cited by examiner

APPARATUS FOR PROVIDING VEHICULAR ENVIRONMENT INFORMATION

FIELD OF THE INVENTION

The present invention relates to an apparatus for providing vehicular environment information, a vehicle having an apparatus for providing vehicular environment information, and a method for providing vehicular environment information.

BACKGROUND INFORMATION

Due to the rapid development of computer science and field of human machine interaction, advanced driver assistance functions for transport vehicles have made use of these technological advances. This includes the field of vehicular environment monitoring.

This can be problematic in the case of trucks or buses, which have different structures and larger sizes, and hence have different viewing zones, blind spots and more complex mirror apparatus in comparison to normal passenger vehicles such as cars. Thus safe driving with larger rigs on a public road is more challenging and requires more attention even for an experienced driver.

Patent document U.S. Pat. No. 6,320,612B1 discusses a vehicular camera system, which is displaying views on a display mounted on the dash of the vehicle. The system transmits video signals of a right and left one of the side front view cameras to the display upon the biasing of a turn signal lever direction.

However, there is a need to further help a driver in a dynamically changing environment.

Therefore, it would be advantageous to have an improved technology for helping a driver in a dynamically changing environment.

SUMMARY OF THE INVENTION

An object of the present invention may be solved with the subject matter of the independent claims, wherein further embodiments are incorporated in the dependent claims. It should be noted that the following described aspects of the invention apply also for the apparatus for providing vehicular environment information, the vehicle having an apparatus for providing vehicular environment information, and the method for providing vehicular environment information.

In a first aspect, there is provided an apparatus for providing vehicular environment information, the apparatus comprising:
 at least one sensor;
 a display monitor; and
 a processing unit;

The at least one sensor is configured to acquire vehicular environment data that is external to a vehicle. The at least one sensor comprises at least one camera, and the vehicular environment data comprises image data. The at least one sensor is also configured to provide the vehicular environment data to the processing unit. The processing unit is configured to determine vehicular environment information. The determination of the vehicular environment information comprises use of the vehicular environment data. The processing unit is also configured to cause the display monitor to display at least part of the image data on the basis of the vehicular environment information.

In this manner, a driver of a vehicle can be automatically provided with image data relating to traffic situations that are occurring. By automatically providing the driver with image data on the basis of vehicular environment information, within a dynamically changing environment the driver's observational workload is reduced because the driver's attention can be focussed on relevant scene data in a specific context. Thus for example, the vehicular environment information can relate to an object, which could also be identified, that has been sensed by at least one sensor, and image data relating to that object is then presented to the driver. For example, a lorry could be reversing and approaching a person stood behind the lorry, and image data showing the person in an image is presented to the driver. For example, the driver could be manoeuvring and the side of the lorry is approaching a bollard, and image data showing the bollard is presented to the driver. For example, the driver could be turning the lorry to the right and a cyclist is at the right hand side of the lorry and the monitor displays an image of the cyclist to the driver, thus providing assisted safe turning on a road.

In this way, automatically selected or relevant parts of camera view(s) or generated image perspectives can be transmitted to a monitor display to inform a driver about situations external to the vehicle.

In an example, the vehicular environment information relates to an object detected within the at least part of the image data.

In other words, the processing unit is configured to analyse the vehicular environment data to determine if there is an object at some position around the vehicle. In an example, the image data is analysed directly to detect the object, through for example image processing. In an example, vehicular environment data that is different to the image data is analysed to detect the object, for example the vehicular environment data could also be radar data and this could be used to detect the object. In this way, if there is one camera acquiring image data, the part of the image containing the object can be presented to the driver. Additionally, if there is more than one camera acquiring image data of different views around the vehicle, the view containing the object (or a subset of that view) can be presented to the driver.

In this manner, a driver is provided with appropriate image data from camera view(s) or generated image perspectives depending upon if an object is detected in a sensing zone, and if more than one camera is operating image data can automatically toggle between images depending upon whether an object is detected in one view.

In an example, the at least one camera comprises at least two cameras. A first camera is configured to acquire first image data for a first scene associated with the vehicle and a second camera is configured to acquire second image data for a second scene associated with the vehicle. The image data comprises the first image data and the second image data, and the at least part of the image data comprises at least a part of the first image data and/or at least a part of the second image data.

In this manner, the apparatus is able to toggle between different views relating to the vehicle, on the basis of situational awareness information (vehicular environment information) that is determined. This could relate to whether an object has been detected (and identified) in a particular image from one or more of the cameras. Also, one image could be shown from one camera, and superimposed upon that image a subset of the image acquired by a second camera can be shown that has an object (such as a child near to a lorry) within it.

In an example, the first image data comprises image data for a rearward facing scene relative to the vehicle.

In other words, the first camera is configured to acquire image data behind the vehicle. Thus for example, the driver can have a monitor that is a rear view mirror replacement monitor. Thus, the driver is conveniently provided with situational awareness information, including a standard view that the driver views frequently.

In an example, the display monitor is internal to the vehicle.

Thus, an external rear view mirror can be replaced by an internal monitor. In addition to providing situational awareness information efficiently and effectively to the driver, improving the effectiveness of driving, vehicle fuel consumption is lowered because the drag of the vehicle has been reduced.

In an example, in a default situation the display monitor is configured to display the image data for the rearward scene.

Thus, the driver is provided with a monitor that is acting in a default manner as a rear view mirror replacement, and if necessary a part of the rear view that is of particular interest that be enhanced, for example if there is an object at that area. Also, the rear view could toggle to a side view or front view or other view around the vehicle, if it is determined that the driver should be made aware of the view. Or, the rearview could have interleaved within it a subset of another view, such as a side view if for example an object is detected by the side of the vehicle.

In an example, the display monitor is a monitor configured to display vehicle telemetry information.

In other words, the display is a display such as a dashboard display that is showing the vehicle speed, engine speed, engine temperature etc. Thus, the display is a display that the driver frequently looks at, and information can be effectively and efficiently provided to the driver.

In an example, the at least one sensor comprises at least one radar sensor, and the vehicular environment data comprises radar data.

This means that day and night and all weather functionality is improved.

In an example, the at least one sensor comprises a driver intention sensor configured to acquire driver intention data. The driver intention sensor is configured to provide the driver intention data to the processing unit. The determination of the vehicular environment information comprises use of the driver intention data.

In other words, the information provided to the driver, regarding a dangerous or potentially dangerous or other situation the driver would like to be informed about, can take into account what the driver intends to do. Thus, for example if a cyclist is at the right hand side of a lorry then and the driver indicates with an indicator stick that he intends to turn right, and/or starts to turn the steering wheel to turn the vehicle to the right, the processing unit can either concentrate processing on the vehicular environment data on the right hand side and is able to determine that a cyclist is in the vicinity more readily, or even if no specific object is detected the processing unit can ensure that imagery to the right hand side of the vehicle is provided to the driver. Also, in addition haptic or audio warnings can be provided to the driver.

In a second aspect, there is provided a vehicle. The vehicle comprises an apparatus for providing vehicular environment information according to the first aspect.

In a third aspect, there is provided a method for providing vehicular environment information, comprising:

a) acquiring with at least one sensor vehicular environment data that is external to a vehicle, wherein, the at least one sensor comprises at least one camera, and the vehicular environment data comprises image data;

b) providing the vehicular environment data to a processing unit;

c) determining with the processing unit vehicular environment information, wherein the determination of the vehicular environment information comprises use of the vehicular environment data; and d) displaying at least part of the image data on a display monitor on the basis of the vehicular environment information, wherein the processing unit causes the display monitor to display the at least part of the image data.

The above aspects and examples will become apparent from and be elucidated with reference to the embodiments described hereinafter.

Exemplary embodiments will be described in the following with reference to the following drawings:

DETAILED DESCRIPTION

Figure 1:
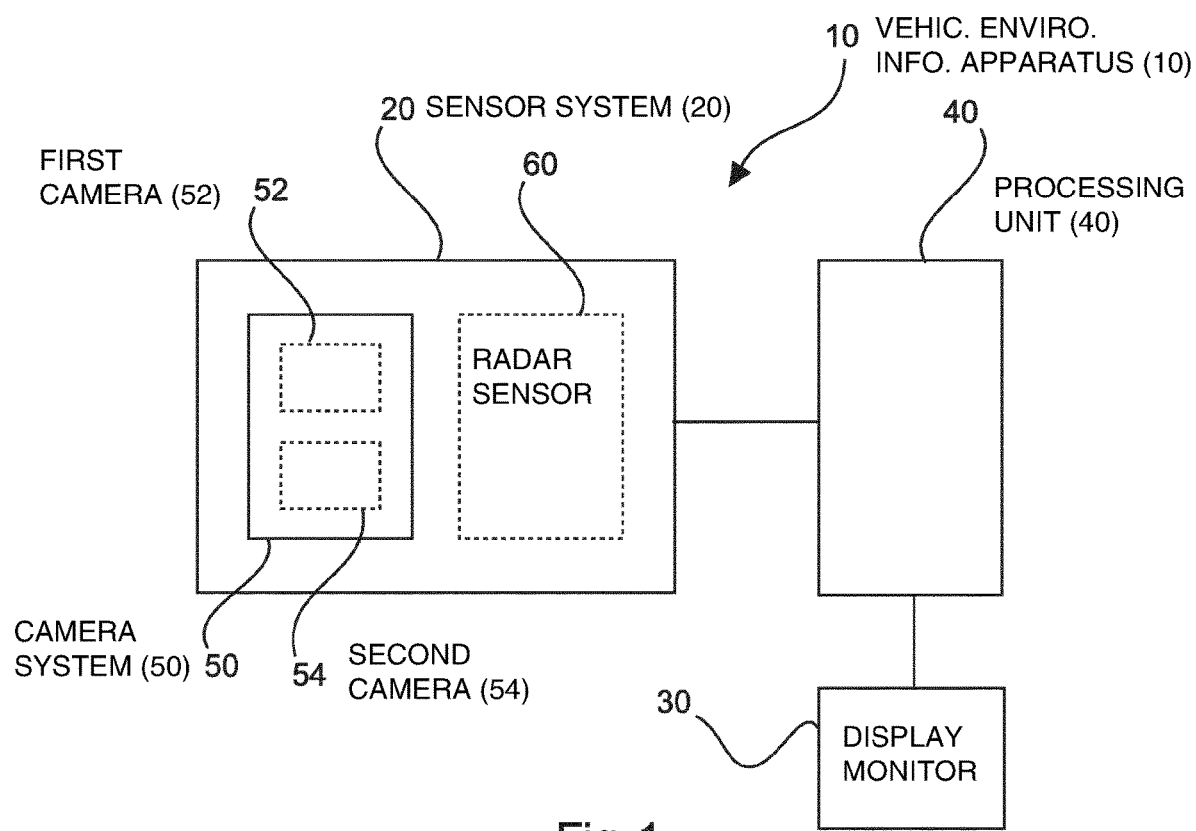
FIG. 1 shows a schematic representation of an example of an apparatus for providing vehicular environment information.

FIG. 1 shows an apparatus 10 for providing vehicular environment information. The apparatus 10 comprises at least one sensor 20, a display monitor 30, and a processing unit 40. The at least one sensor 20 is configured to acquire vehicular environment data that is external to a vehicle 100. The apparatus can be retro-fitted to an existing vehicle. The at least one sensor 20 comprises at least one camera 50, and the vehicular environment data comprises image data. The at least one sensor 20 is configured to provide the vehicular environment data to the processing unit 40. This is done via wired or wireless communication. The processing unit 40 is configured to determine vehicular environment information. The determination of the vehicular environment information comprises use of the vehicular environment data. The processing unit 40 is configured to cause the display monitor 30 to display at least part of the image data on the basis of the vehicular environment information.

In an example, the image data can be being acquired by more than one camera, and the at least part of the image data is image data provided by one of those cameras. Thus for example, one camera could be a downward looking camera providing an image of the roadside next to a driver's cab and another camera could be providing imagery of the rearward scene viewed from the cab. Thus, either the rearward scene or the downward scene could be provided to the driver. The complete scene as viewed by one of those cameras could be provided, or a subset of that scene could be provided.

In an example, the image data can be being acquired by more than one camera, and the at least part of the image data is image data provided by both of those cameras. Thus for example, one camera could be a downward looking camera providing an image of the roadside next to a driver's cab and another camera could be providing imagery of the rearward scene viewed from the cab. Thus, the driver could be reversing and turning the lorry at the same time, and if the lorry was approaching a lamppost at the rear and the driver cab was turning toward a bollard at the side of the cab, the monitor could present image data from the rear of the lorry showing the lamppost and at the same time show image data of the bollard next to the cab. These images could for example be presented side by side, or one image interleaved within the other.

In an example, the at least one camera comprises a visible camera. In an example, the at least one camera comprises an infrared camera. In an example, a camera can operate in a visible mode and in an infrared mode, thus providing imagery that is a mixture of visible and infrared data. In an example, the at least one camera comprises a far field camera. In an example, the at least one camera comprises a downward looking camera. In an example, the at least one camera comprises a rearward looking camera. In an example, the at least one camera comprises a forward looking camera.

As described above, a camera can be a visible camera. In other words, the camera can sense rays in the visible frequency range, like photographic cameras. Also, the a camera can be an infrared camera. In other words, the camera can sense rays in the infrared frequency range. In an example, an infrared camera has an integrated lighting element and therefore can enhance operation during the night, but in other examples the infrared camera does not have such an integrated lighting element. The infrared camera may have a lower color resolution than a visible camera, however the skilled person will appreciate what type of camera to use and indeed a visible camera and an infrared camera can be used together, which could be integrated into a single camera.

In this manner, scene information can be processed to determine the identity of objects with high degrees of confidence.

According to an example, the vehicular environment information relates to an object detected within the at least part of the image data. The object can be detected using appropriate object detection processing of the vehicular environment data.

In an example, the processing unit is configured to determine from the vehicular environment data the location of the object in the image data. The location of the object could be determined directly from image data, using image processing analysis. The location can be determined from vehicular environment data that is different to the image data, for example radar data. The location could be determined on the basis of image data and on the basis of non-image data, for example with image data and radar data both being analysed. In other words, in an acquired image the position of an object in that image is determined, and this enables a subset of that overall image that includes the object to be shown to the driver.

In an example, the processing unit is configured to determine the identity of the object from the vehicular environment data. Thus, data can be analysed to determine if a human is near to the vehicle, whether a bicyclist is near to the vehicle, whether another vehicle is nearby, whether a lamppost or bollard is near to the vehicle etc. This could be determined from image data or from non-image data (e.g. radar), or from both image and non-image data. Thus, by identifying an object, the most important view can be provided to the driver. For example, a number of objects could be detected in a scene, such as a bollard and a child near to the vehicle, and the apparatus highlights to the driver the scene with the child as this is more important. Likewise, if two cameras are operating, with image data being that provided from the two cameras, then the view from the camera showing the child could be shown to the driver rather than that with a bollard. Or, an image with a bollard could be shown at the same time as an image with the child, but the image with the child then shown as being of more importance—shown brighter or in a flashing mode, or otherwise shown with increased importance.

According to an example, the at least one camera 50 comprises at least two cameras. A first camera 52 is configured to acquire first image data for a first scene associated with the vehicle and a second camera 54 is configured to acquire second image data for a second scene associated with the vehicle. The image data comprises the first image data and the second image data, and wherein the at least part of the image data comprises at least a part of the first image data and/or at least a part of the second image data.

According to an example, the first image data comprises image data for a rearward facing scene relative to the vehicle.

According to an example, the display monitor 30 is internal to the vehicle.

According to an example, in a default situation the display monitor 30 is configured to display the image data for the rearward scene. In other words, the processing unit causes the display monitor to display this image data.

According to an example, the display monitor 30 is a monitor configured to display vehicle telemetry information. Thus, the display monitor can be a normal dashboard monitor, such as that showing vehicle speed, engine speed, etc, and as such is a monitor that the driver frequently looks at and environmental information external to the vehicle can efficiently be made available to the drive.

According to an example, the at least one sensor 20 comprises at least one radar sensor 60, and the vehicular environment data comprises radar data.

In an example, the at least one radar sensor comprises a far field radar sensor. In an example, the at least one radar sensor comprises a downward looking radar sensor. In an example, the at least one radar sensor comprises a rearward looking radar sensor. In an example, the at least one radar sensor comprises a forward looking radar sensor.

According to an example, the at least one sensor comprises a driver intention sensor configured to acquire driver intention data. The driver intention sensor is configured to provide the driver intention data to the processing unit. The determination of the vehicular environment information comprises use of the driver intention data. The processing unit can process vehicular environment data taking into account the driver intention, for example concentrating processing of environment data on the right hand side of the vehicle if the driver intends to turn right. The processing unit can also provide default image data on the basis of the driver intention, for example providing imagery of the right hand side of the vehicle if the vehicle is turning right, and similarly imagery for the other side of the vehicle if turning left.

In an example, an audio and/or haptic warning can be provided to the driver on the basis of vehicular environment information.

In an example, the apparatus is integrated into a vehicle.

Figure 2:
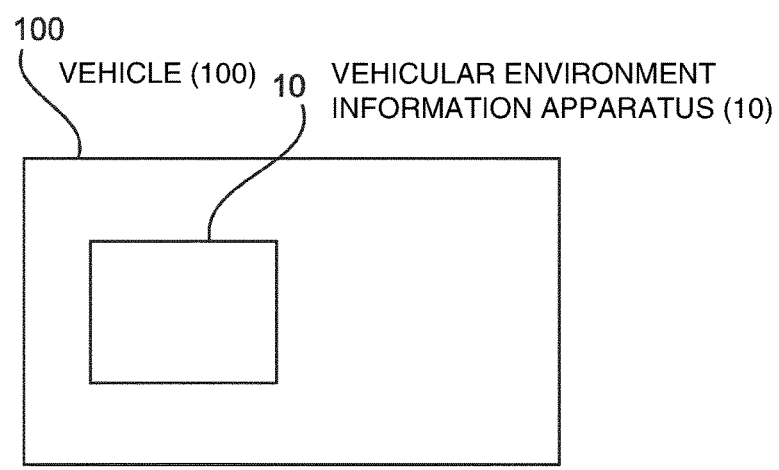
FIG. 2 shows a schematic representation of an example of a vehicle with an apparatus for providing vehicular environment information.

FIG. 2 shows a vehicle 100. The vehicle comprises an apparatus 10 for providing vehicular environment information as described with respect to FIG. 1.

Figure 3:
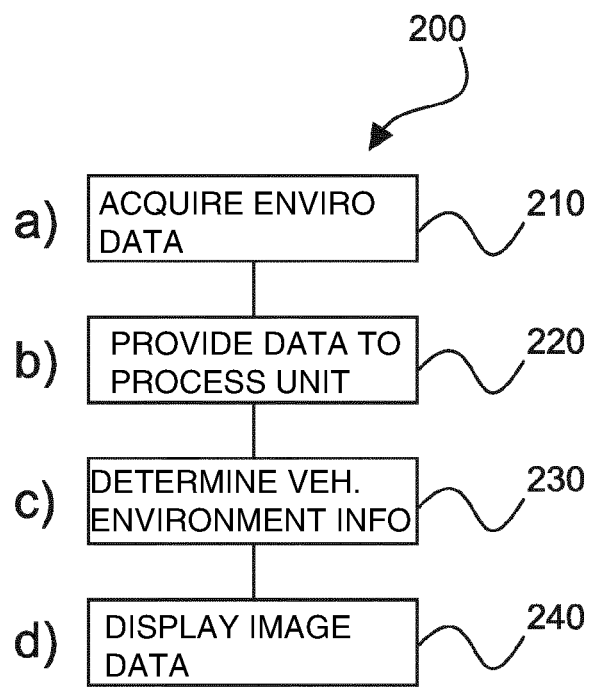
FIG. 3 shows a method for providing vehicular environment information.

FIG. 3 shows a method 200 for providing vehicular environment information in its basic steps. The method comprising:

in an acquiring step 210, also referred to as step a), acquiring with at least one sensor 20 vehicular environment data that is external to a vehicle. The at least one sensor 20 comprises at least one camera 50, and the vehicular environment data comprises image data;

in a providing step 220, also referred to as step b), providing the vehicular environment data to a processing unit 40;

in a determining step, also referred to as step c), determining with the processing unit 40 vehicular environment information. The determination of the vehicular environment information comprises use of the vehicular environment data; and in a displaying step 240, also referred to as step d), displaying at least part of the image data on a display monitor 30 on the basis of the vehicular environment information. The processing unit 40 causes the display monitor 30 to display the at least part of the image data.

Figure 4:
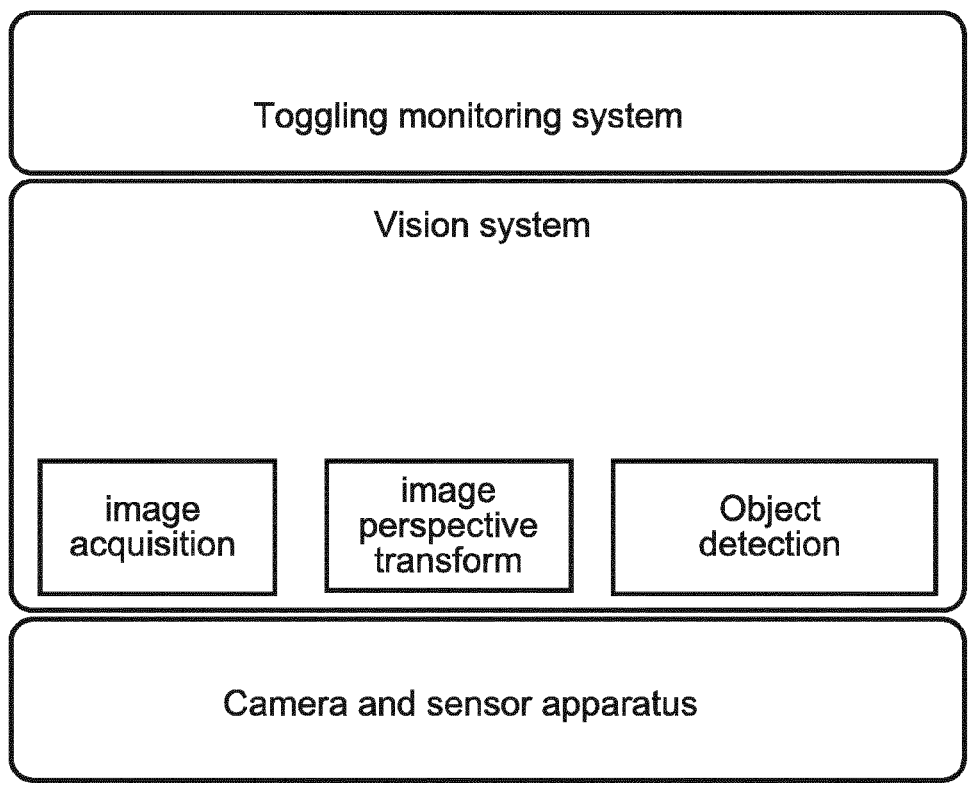
FIG. 4 shows a block diagram relating to an example of an apparatus for providing vehicular environment information.
Figure 5:
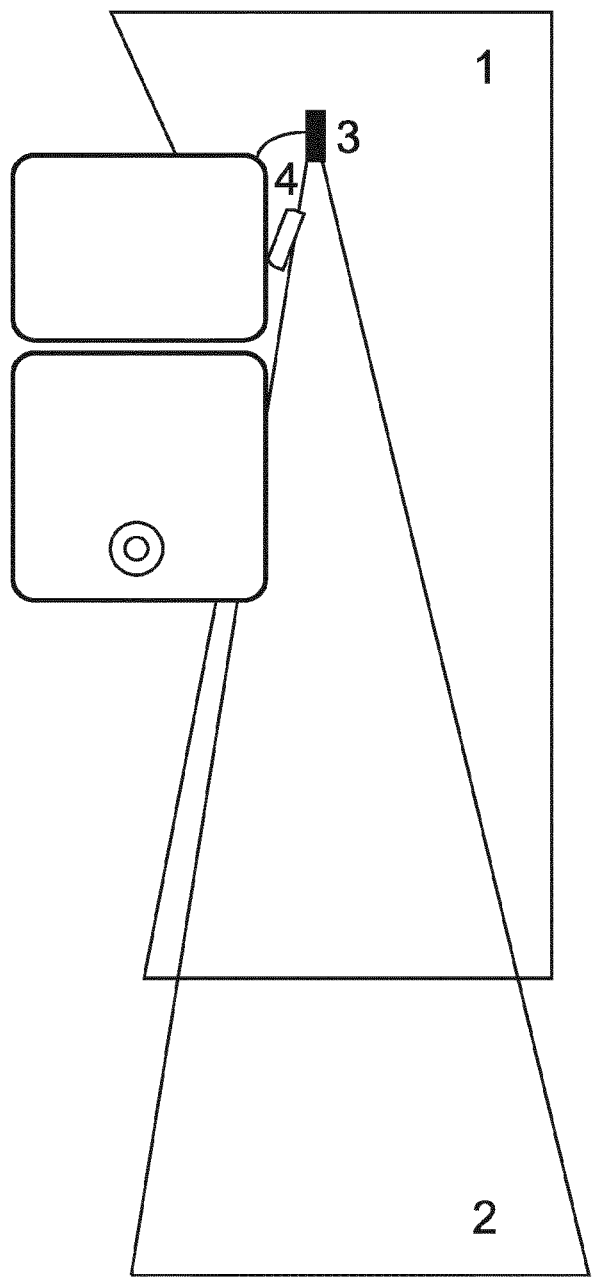
FIG. 5 shows a plan view of a lorry showing sensing zones of an example of an apparatus for providing vehicular environment information.
Figure 6:
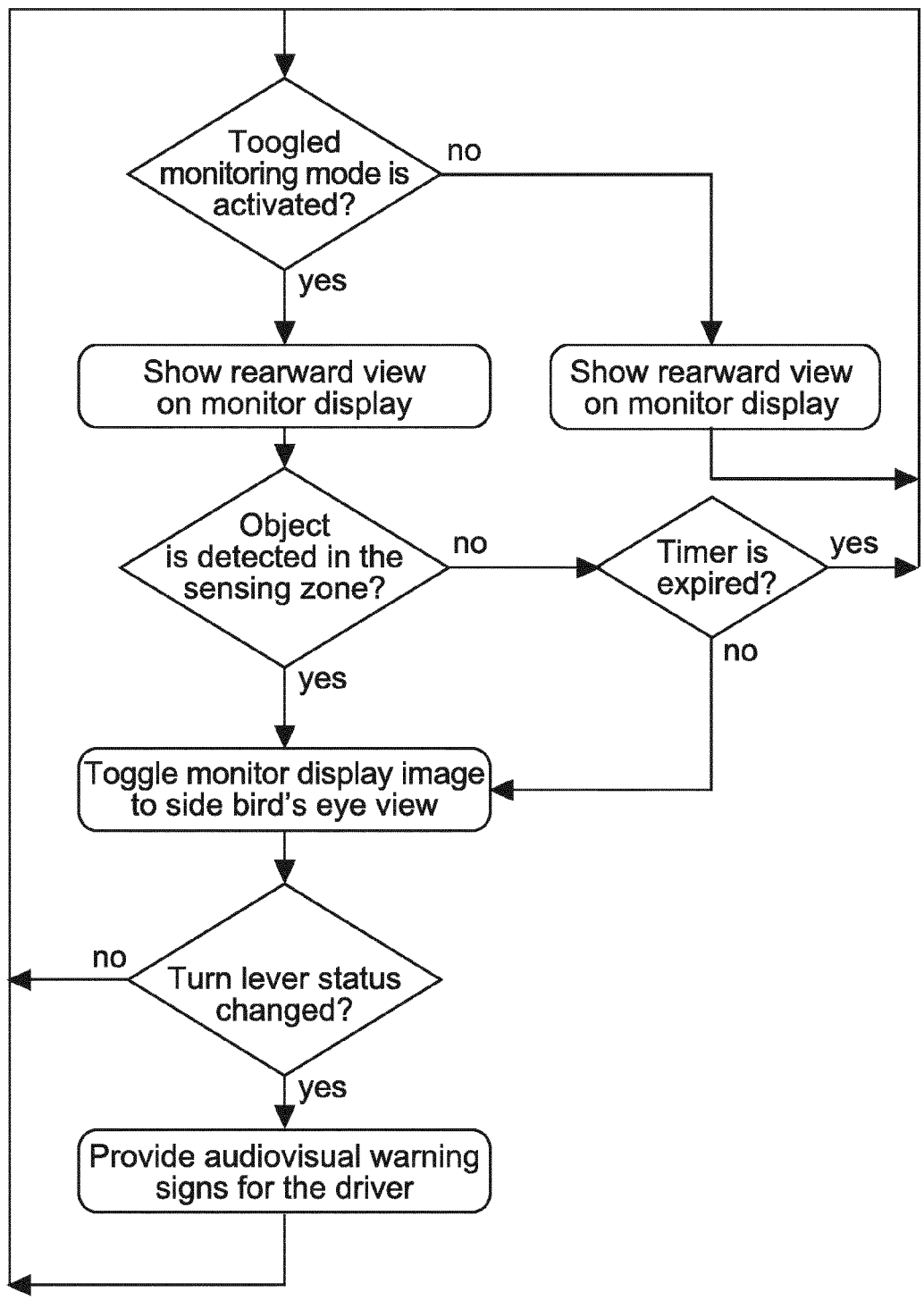
FIG. 6 shows a detailed workflow for example of an apparatus for providing vehicular environment information.

The apparatus, vehicle and method are now described in more detail with respect to FIG. 4, FIG. 5, and FIG. 6.

In relation to a specific example, a vehicle incorporates an apparatus that senses and monitors the environment around the vehicle, and provides an automated toggling vision display function that eases the observation in a dynamically changing environment by focusing the driver's attention on relevant objects in a specific context (e.g. assisting safe turning on a road). In the case of trucks or buses, which have different viewing zones, blind spots and more complex mirror apparatus in comparison to cars and vans, driving is particularly challenging. The vehicle having the described apparatus provided for an improvement in the monitoring of the vehicle's environment for the driver in important and even critical situations, and eases the workload faced by the driver. Furthermore, mirrors can also be replaced having a positive effect regarding the vehicle fuel consumption. The apparatus can also be used in relation to cars and vans, but provides particular advantages with respect to larger vehicles.

FIG. 4 shows a block diagram of the component parts of the apparatus, which are enabling the driver's situation awareness to be improved. According to FIG. 4, the apparatus, also referred to as a monitoring toggling system, has interfaces to the sensor apparatus and incorporates an image acquisition subsystem, an image perspective transforming subsystem and an object detection subsystem. The apparatus shown in FIG. 4 helps a commercial vehicle driver to perform turning maneuvers on a road in a more convenient and safer way, with a reduction in the difficulties of using the traditional mirror apparatus of a motor vehicle. To avoid accidents in traffic situations and to provide environmental information backwardly and around the vehicle in a more straightforward manner, the toggling monitoring system helps the commercial vehicle driver to observe the vehicle environment by providing appropriate viewing modalities and with emphasizing the focus on the events which may have critical outcome.

The apparatus offers a non-intrusive, toggled, vehicle monitoring system that eases the driver's environmental observation during important, and critical, traffic situations. A monitor inside the vehicle, is implemented in a dashboard screen or instrument console or mounted on the A-column of cabine. The monitor can be mounted elsewhere, and can be a rearview mirror replacement, which could be internal or external to the cab. Depending on the traffic context, which is automatically recognized by a vision system via the object detection subsystem, an appropriate camera-view representation focusing on the occurring traffic situation is displayed. This informs the driver about the vehicular environment, for more convenient and safer driving. The toggled monitor display system can be implemented with a system using at least two cameras, an environmental sensing apparatus and object detection subsystem, and has an interface to at least one monitor display to transmit camera views and image modalities.

Referring to FIG. 5, a plan view of a lorry is shown. The vision zone of the toggled monitoring display system can be seen in the specific example shown in FIG. 5, and different vision or scene zones can be implemented. The vision zone 1 represents environment scene data of the surroundings of the vehicle captured by a downward looking camera mounted on an arm 3 attached to the vehicle. The environment scene data acquired by the downward looking camera can be augmented, or extended, by another active sensor 4 (e.g. a radar) to obtain adequate object detection in all weather conditions, and improve night time operation. In addition, the toggled monitoring system also comprises a mirror replacement functionality, represented by a vision zone 2 in FIG. 5. This represents image data acquired, or observed, by a rearward facing camera that is also installed to the arm 3 that is provided by the vision system. The toggled monitoring system is able to simultaneously visualize different camera views and/or image modalities and/or partial camera view representations, depending, and focusing on, relevant traffic situations and can warn its user about critical traffic events.

FIG. 6 then shows a detailed workflow, or flowchart, of the apparatus (or toggled monitoring system) as shown in FIG. 5. The toggled monitoring system has an active and passive status. In the passive status, the display shows in this example the rearward looking view that is used to replace the traditional mirror functionalities during driving on a road. While the system is activated, depending on whether an object is present in the vision zone 1 (vicinity of the vehicle) in FIG. 5, the monitor display toggles to the relevant camera view or image representation to inform its user about the occurring traffic situation. Furthermore, when the system is activated, and recognizes that the driver is intending to perform turnings, the toggled monitoring system can provide audio-visual warning signs to help the driver to evade dangerous traffic situations. As an alternative only a part of the monitor display is toggled, while the rest shows the original image or camera view.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The LIST OF REFERENCE NUMBERS is as follows:

10 An apparatus for providing vehicular environment information;
20 At least one sensor;
30 A display monitor;
40 A processing unit;
50 At least one camera;
52 A first camera;
54 A second camera;
60 At least one radar sensor;
100 A vehicle;
200 A method for providing vehicular environment information;
210 Acquiring with at least one sensor vehicular environment data;
220 Providing the vehicular environment data to a processing unit;
230 Determining with the processing unit vehicular environment information, comprising use of the vehicular environment data.
240 Displaying at least part of the image data on a display monitor on the basis of the vehicular environment information.

The invention claimed is:

1. A monitoring toggling system for providing vehicular environment information for a vehicle, comprising:
   at least one sensor;
   a display monitor; and
   a processing unit;
   wherein the at least one sensor is configured to acquire vehicular environment data that is external to a vehicle,
   wherein the at least one sensor includes at least one camera, and the vehicular environment data includes image data,
   wherein the at least one sensor is configured to provide the vehicular environment data to the processing unit,
   wherein the processing unit is configured to determine vehicular environment information, wherein the determination of the vehicular environment information includes use of the vehicular environment data,
   wherein the processing unit is configured to cause the display monitor to display at least part of the image data based on the vehicular environment information,
   wherein the at least one camera includes at least two cameras, wherein a first camera is configured to acquire first image data for a first scene associated with the vehicle and a second camera is configured to acquire second image data for a second scene associated with the vehicle, and wherein the image data includes the first image data and the second image data, and wherein the at least part of the image data includes at least a part of the first image data and/or at least a part of the second image data,
   wherein the processing unit is configured to automatically toggle between showing a first display image and a second display image on the display monitor and/or to automatically toggle superimposed views on the display monitor, based on the vehicular environment information and whether an object has been detected in the image data,
   wherein the at least one sensor includes the at least one camera and at least one active sensor, and the vehicular environment information includes radar data,
   wherein environment scene data acquired by the at least one camera is augmented or extended by the active sensor to obtain detection of the object in different weather conditions and improve night-time operation,
   wherein a driver is provided with image data from camera views and generated image perspectives depending upon if the object is detected in a sensing zone, and if more than one camera is operating, image data is automatically toggle-able between images depending upon whether the object is detected in one of the camera views,
   wherein the toggling monitoring system has an active status and a passive status, wherein in the passive status, the display monitor shows a rearward looking view that is used to replace traditional mirror functionalities during driving on a road, and wherein in the active status, depending on whether the object is present in a first vision zone, in a vicinity of the vehicle, the display monitor toggles to a relevant camera view or image representation to inform the driver about an occurring traffic situation, and
   wherein the vehicle is a truck or a bus.

2. The monitoring toggling system of claim 1, wherein the vehicular environment information relates to an object detected within the at least part of the image data.

3. The monitoring toggling system of claim 1, wherein the first image data includes image data for a rearward facing scene relative to the vehicle.

4. The monitoring toggling system of claim 3, wherein the display monitor is internal to the vehicle.

5. The monitoring toggling system of claim 4, where in a default situation the display monitor is configured to display the image data for the rearward scene.

6. The monitoring toggling system of claim 1, wherein the display monitor is a monitor configured to display vehicle telemetry information.

7. The monitoring toggling system of claim 1, wherein, the at least one sensor includes a driver intention sensor configured to acquire driver intention data, wherein the driver intention sensor is configured to provide the driver intention data to the processing unit, and wherein the determination of the vehicular environment information includes use of the driver intention data.

8. A vehicle, comprising:
   a monitoring toggling system for providing vehicular environment information for a vehicle, including:
      at least one sensor;
      a display monitor; and
      a processing unit;
      wherein the at least one sensor is configured to acquire vehicular environment data that is external to a vehicle, wherein the at least one sensor includes at least one camera, and the vehicular environment data includes image data, wherein the at least one sensor is configured to provide the vehicular environment data to the processing unit, wherein the processing unit is configured to determine vehicular environment information, wherein the determination of the vehicular environment information includes use of the vehicular environment data, wherein the processing unit is configured to cause the display monitor to display at least part of the image data based on the vehicular environment information, wherein the at least one camera includes at least two cameras, wherein a first camera is configured to acquire first image data for a first scene associated with the vehicle and a second camera is configured to acquire second image data for a second scene associated with the vehicle, and wherein the image data includes the first image data and the second image data, and wherein the at least part of the image data includes at least a part of the first image data and/or at least a part of the second image data, wherein the processing unit is configured to automatically toggle between showing a first display image and a second display image on the display monitor and/or to automatically toggle superimposed views on the display monitor, based on the vehicular environment information and whether an object has been detected in the image data, wherein the at least one sensor includes the at least one camera and at least one active sensor, and the vehicular environment information includes radar data, wherein environment scene data acquired by the at least one camera is augmented or extended by the active sensor to obtain detection of the object in different weather conditions and improve night-time operation, wherein a driver is provided with image data from camera views and generated image perspectives depending upon if the object is detected in a sensing zone, and if more than one camera is operating, image data is automatically toggle-able between images depending upon whether the object is detected in one of the camera views, wherein the toggling monitoring system has an active status and a passive status, wherein in the passive status, the display monitor shows a rearward looking view that is used to replace traditional mirror functionalities during driving on a road, and wherein in the active status, depending on whether the object is present in a first vision zone, in a vicinity of the vehicle, the display monitor toggles to a relevant camera view or image representation to inform the driver about an occurring traffic situation, and wherein the vehicle is a truck or a bus.

9. A method for providing vehicular environment information for a vehicle by a monitoring toggling system, the method comprising:

acquiring, via at least one sensor, at least one sensor vehicular environment data that is external to a vehicle, wherein, the at least one sensor includes at least one camera, and the vehicular environment data includes image data, and wherein the mintoring toggling system includes the at least one sensor, the processing unit, and the display monitor;

providing the vehicular environment data to a processing unit;

determining with the processing unit vehicular environment information, wherein the determination of the vehicular environment information includes use of the vehicular environment data; and displaying at least part of the image data on a display monitor based on the vehicular environment information, wherein the processing unit causes the display monitor to display the at least part of the image data;

wherein the at least one camera includes at least two cameras, wherein a first camera is configured to acquire first image data for a first scene associated with the vehicle and a second camera is configured to acquire second image data for a second scene associated with the vehicle, and wherein the image data includes the first image data and the second image data, and wherein the at least part of the image data includes at least a part of the first image data and/or at least a part of the second image data, wherein the processing unit is configured to automatically toggle between showing a first display image and a second display image on the display monitor and/or to automatically toggle superimposed views on the display monitor, based on the vehicular environment information and whether an object has been detected in the image data, wherein the at least one sensor includes the at least one camera and at least one active sensor, and the vehicular environment information includes radar data, wherein environment scene data acquired by the at least one camera is augmented or extended by the active sensor to obtain detection of the object in different weather conditions and improve night-time operation, wherein a driver is provided with image data from camera views and generated image perspectives depending upon if the object is detected in a sensing zone, and if more than one camera is operating, image data is automatically toggle-able between images depending upon whether the object is detected in one of the camera views, wherein the toggling monitoring system has an active status and a passive status, wherein in the passive status, the display monitor shows a rearward looking view that is used to replace traditional mirror functionalities during driving on a road, and wherein in the active status, depending on whether the object is present in a first vision zone, in a vicinity of the vehicle, the display monitor toggles to a relevant camera view or image representation to inform the driver about an occurring traffic situation, and wherein the vehicle is a truck or a bus.

* * * * *